United States Patent
Goh et al.

(10) Patent No.: US 10,106,421 B2
(45) Date of Patent: Oct. 23, 2018

(54) COMPOSITION AND METHOD FOR DEPOLYMERIZATION OF CURED EPOXY RESIN MATERIALS USING TRANSITION METAL SALTS

(71) Applicant: Korea Institute of Science and Technology, Seoul (KR)

(72) Inventors: Munju Goh, Wanju-gun (KR); Nam Ho You, Wanju-gun (KR); Hyeonuk Yeo, Wanju-gun (KR); Bon-Cheol Ku, Wanju-gun (KR); Sang Jun Youn, Wanju-gun (KR); Jin Won Yu, Wanju-gun (KR); Jin Jung, Wanju-gun (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/380,460

(22) Filed: Dec. 15, 2016

(65) Prior Publication Data

US 2017/0174523 A1 Jun. 22, 2017

(30) Foreign Application Priority Data

Dec. 16, 2015 (KR) ........................ 10-2015-0180187

(51) Int. Cl.
| | | |
|---|---|---|
| *C07C 29/10* | (2006.01) | |
| *B01J 23/34* | (2006.01) | |
| *B01J 23/26* | (2006.01) | |
| *B01J 23/36* | (2006.01) | |
| *B01J 23/46* | (2006.01) | |
| *B01J 27/13* | (2006.01) | |
| *B01J 23/22* | (2006.01) | |
| *C01B 31/04* | (2006.01) | |
| *C01F 7/02* | (2006.01) | |
| *C08J 11/16* | (2006.01) | |
| *C01B 32/17* | (2017.01) | |
| *C01B 32/23* | (2017.01) | |
| *C01B 32/196* | (2017.01) | |
| *C01B 32/956* | (2017.01) | |

(52) U.S. Cl.
CPC ........... *C01B 31/0492* (2013.01); *B01J 23/22* (2013.01); *B01J 23/26* (2013.01); *B01J 23/34* (2013.01); *B01J 23/36* (2013.01); *B01J 23/466* (2013.01); *B01J 27/13* (2013.01); *C01B 32/17* (2017.08); *C01B 32/196* (2017.08); *C01B 32/23* (2017.08); *C01B 32/956* (2017.08); *C01F 7/021* (2013.01); *C08J 11/16* (2013.01); *C08J 2300/24* (2013.01); *C08J 2363/00* (2013.01)

(58) Field of Classification Search
CPC . C01B 31/0492; C01B 31/043; C01B 31/026; C01B 31/36; C01B 32/17; C01B 32/23; C01B 32/196; C01B 32/956; C01F 7/021; B01J 23/34; B01J 23/26; B01J 23/22; B01J 23/36; B01J 23/466; B01J 27/13; C08J 11/16; C08J 2300/24; C08J 2363/00
See application file for complete search history.

(56) References Cited

U.S. PATENT DOCUMENTS

| | | | |
|---|---|---|---|
| 2002/0169222 | A1 | 11/2002 | Terada et al. |
| 2004/0102533 | A1 | 5/2004 | Durand et al. |
| 2011/0184077 | A1 | 7/2011 | Goto et al. |
| 2013/0317238 | A1* | 11/2013 | Mohanty ................... C07C 4/22 549/266 |
| 2014/0023581 | A1 | 1/2014 | Adam |
| 2014/0174257 | A1 | 6/2014 | Ohira et al. |

FOREIGN PATENT DOCUMENTS

| | | |
|---|---|---|
| CN | 102391543 A | 3/2012 |
| FR | 2.178.748 | 11/1973 |
| JP | 2003-55498 A | 2/2003 |
| JP | 2004-502811 A | 1/2004 |
| JP | 2004-231695 A | 8/2004 |
| JP | 2005-139440 A | 6/2005 |
| JP | 2005-255835 A | 9/2005 |
| JP | 2005-255899 A | 9/2005 |
| JP | 2009-19141 A | 1/2009 |
| JP | 2013-107973 A | 6/2013 |
| JP | 2013-249386 A | 12/2013 |
| JP | 2015-48427 A | 3/2015 |
| KR | 10-2002-0066046 A | 8/2002 |
| KR | 10-2011-0070854 A | 6/2011 |

(Continued)

OTHER PUBLICATIONS

Machine Translation of JP 2003-055498 to Chubu Electric Power Co Inc., et al.*
Uematsu, et al., Static Dielectric Constant of Water and Steam, J. Phys. Chem. Ref. Data, 1980; 9(4): 1291-1306.*
DATABASE WPI Week 200370 Thomson Scientific, London, GB; AN 2003-735269, XP-002768965 (2 pages, in English)
Extended European Search Report dated Apr. 19, 2017 in counterpart European Patent Application No. 16204007.5 (7 pages, in English).

(Continued)

*Primary Examiner* — Daniel C McCracken
(74) *Attorney, Agent, or Firm* — NSIP Law

(57) ABSTRACT

For depolymerization of a cured epoxy resin material, used is a composition including a transition metal salt or a transition metal oxide containing a transition metal element (metal element that belongs to Groups 3-12 in the Periodic Table). In the reaction solvent, an oxidation occurs by the medium of the transition metal element so that the cured epoxy resin material may be depolymerized and decomposed. In this manner, it is possible to carry out depolymerization of a cured epoxy resin material at a temperature of 200° C., specifically 100° C. or lower very simply and rapidly, and to reduce the processing cost and energy requirement.

10 Claims, 9 Drawing Sheets

(56) References Cited

FOREIGN PATENT DOCUMENTS

KR  10-2011-0113428 A  10/2011
KR  10-2013-0122973 A  11/2013

OTHER PUBLICATIONS

Lester, Edward, et al. "Microwave Heating As a Means for Carbon Fibre Recovery From Polymer Composites: A Technical Feasibility Study." *Materials Research Bulletin* 39.10 (2004): 1549-1556. (8 pages, in English).

Li, Juan, et al. "A Promising Strategy for Chemical Recycling of Carbon Fiber/Thermoset Composites: Self-Accelerating Decomposition in a Mild Oxidative System." *Green Chemistry* 14.12 (2012): 3260-3263. (4 pages, in English).

F. Hasko et al., "Galvanizing Different Plastics," *Galvanotechnik Journal*, vol. 68, No. 9, 1977 pp. 800-803 (1 page in English, 4 pages in German).

Japanese Office Action dated Jul. 10, 2018, in corresponding Japanese Application No. 2017-079578 (4 pages, in Japanese).

\* cited by examiner 0 h 3 h

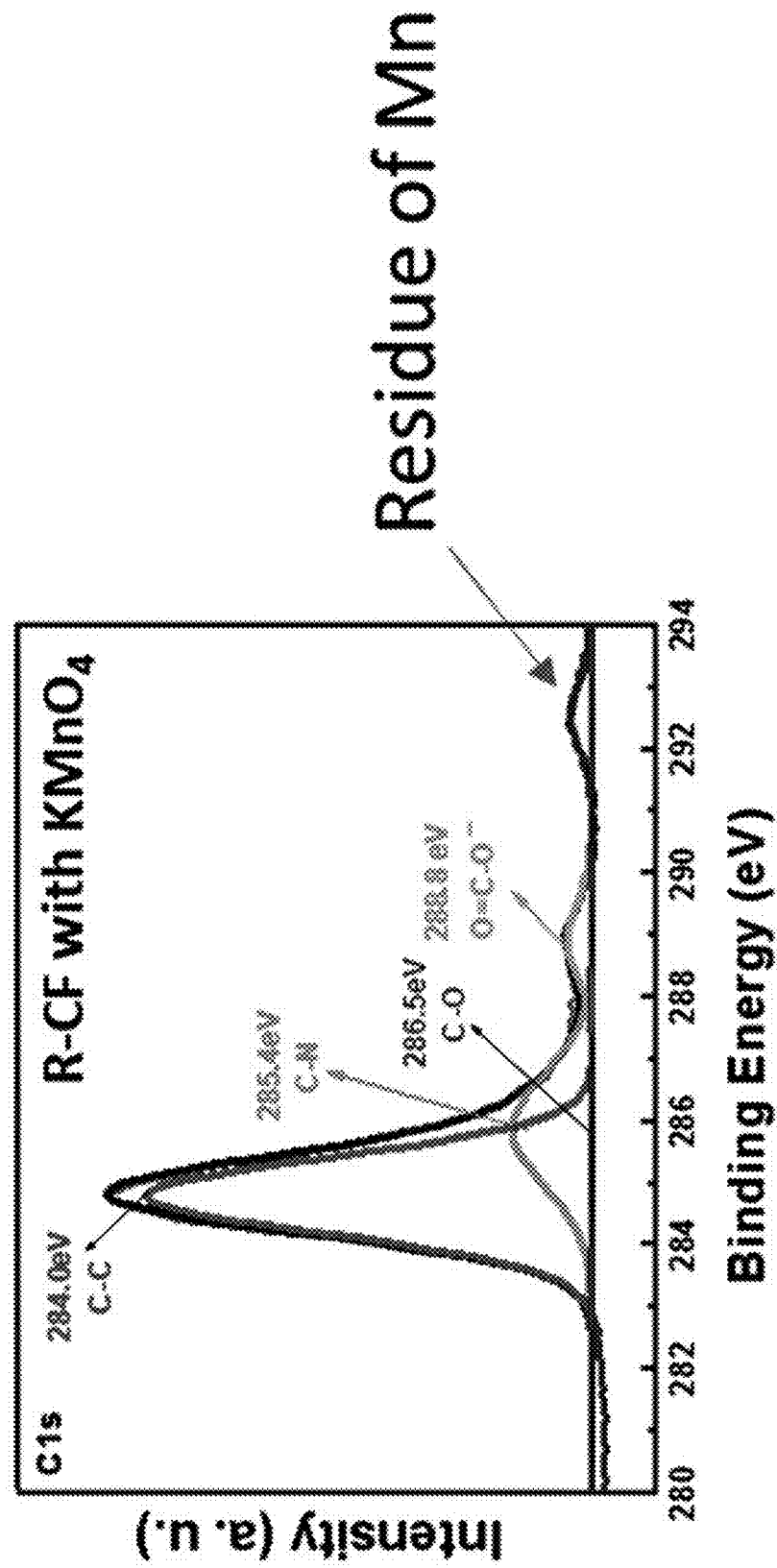

FIG.8C

XPS elemental contents

|  | C | O | Mn | K |
|---|---|---|---|---|
| CF | 76.4 % | 22.2 % | - | - |
| R-CF with KMnO$_4$ | 72.2 % | 24.9 % | 2.1 % | 0.8 % |

COMPOSITION AND METHOD FOR DEPOLYMERIZATION OF CURED EPOXY RESIN MATERIALS USING TRANSITION METAL SALTS

CROSS-REFERENCE TO RELATED APPLICATION

This application claims the priority of Korean Patent Application No. 10-2015-0180187, filed on Dec. 16, 2015, and all the benefits accruing therefrom under 35 U.S.C. § 119, the contents of which in its entirety are herein incorporated by reference.

BACKGROUND

1. Field

The present disclosure relates to a method and a composition for depolymerization of cured epoxy resin materials using transition metal salts. More particularly, the present disclosure relates to a method for depolymerization of cured epoxy resin materials using transition metal salts and a composition used therefor, a method for separating fillers from cured epoxy resin materials, fillers obtained by the method, etc.

2. Description of the Related Art

An epoxy resin is a thermosetting resin including a network polymer formed by ring-opening of epoxy groups generated when mixing an epoxy monomer having two or more epoxy groups in its molecule with a curing agent. Such an epoxy resin has excellent chemical resistance and durability, shows a low volumetric shrinkage upon curing, and thus may be used as a highly functional raw materials which are essential for various industrial fields, including adhesives, paints, electronic/electric industry, civil engineering/architectural industry, or the like.

In the field of composite materials that have been spotlighted recently, an epoxy resin is combined with various filler materials and used for various applications, including space aviation, info-communications and new energy fields. Thus, there has been an increasing demand for such epoxy resins. Particularly, carbon fiber reinforced plastics (CFRP) obtained by combination with carbon fibers are light and show excellent physical properties and durability, and thus are used widely as a key material in the field of cars or space aviation. In addition, epoxy resins combined with the other polymer resin materials have been used widely for producing high-performance materials.

An epoxy resin, once cured, forms a three-dimensional crosslinked network structure, which has strong resistance against chemicals. Thus, such an epoxy resin advantageously imparts materials with high durability and anticorrosive property, but undesirably has a difficulty in treating and reutilizing the materials after use.

Most cured epoxy resin materials have been treated by reclamation. This is significant waste in terms of cost and may cause severe environmental pollution.

Recently, a composite material of an epoxy resin with a filler has been increasingly in use, active studies have been conducted about methods for decomposing an epoxy resin selectively so that a filler material more expensive than an epoxy resin may be separated effectively.

Currently, the most generally used method for decomposing an epoxy resin and separating a filler material is a pyrolysis process. For example, in case of carbon fiber reinforced plastics (CFRP) using carbon fibers as fillers, Japanese companies, such as Toray, Teijin and Mitsubishi, have been taking the lead in treatment and recycle of CFRP based on pyrolysis in an amount of 1000 tons per year. However, separation of carbon fibers through a pyrolysis process requires a pretreatment process including preliminarily crushing CFRP mechanically. When CFRP is crushed to a size of several millimeters, carbon fibers may also be crushed and the carbon fibers to be recycled have a decreased length, which adversely affect the properties of carbon fibers. In addition, above all, such a pyrolysis process requires a high temperature of 500° C. or higher where organic compounds produce materials, such as dioxin, harmful to the human body due to combustion thereof.

Therefore, various chemical decomposition processes have been studied to decompose an epoxy resin efficiently at a lower temperature.

For example, when an epoxy resin is decomposed under supercritical or subcritical fluid, it is possible to treat a cured epoxy resin material at a temperature of 250-400° C. that is lower than the temperature of a pyrolysis process. When using such a process, there is an advantage in that the recovered filler material is less deteriorated as compared to a pyrolysis process.

However, according to the researches by the inventors of the present disclosure, the above method still requires a high temperature and high pressure of 10 atm or higher. Thus, the above method requires a special processing system capable of resisting such conditions, resulting in poor cost efficiency.

Meanwhile, some studies have been conducted to carry out decomposition of an epoxy resin under milder and more general processing conditions. However, in this case, it is not possible to dissolve various cured epoxy resin materials, including cured multi-functional epoxy resin materials or cured epoxy resin materials using an acid anhydride-based curing agent or aromatic diamine-based curing agent. In addition, a long reaction time and high reaction energy are still required. Moreover, it is problematic that various organic solvents harmful to the human body are used as main solvents for the reaction system.

Particularly, many numbers of conventional methods using an organic solvent as their main solvent for decomposition of an epoxy resin are known.

For example, there is disclosed a method for depolymerization of a waste printed circuit board by introducing an electrolyte containing an alkali metal and adding an organic solvent thereto (Korean Patent Application Publication No. 2011-0113428).

In addition, there is disclosed a method for treating an epoxy resin by crushing and acid-treating the epoxy resin and further treating the epoxy resin with an organic solvent and oxidant in a sealed reaction container (Chinese Patent No. 102391543).

There is also disclosed a method for decomposing an epoxy resin by using hydrogen peroxide and acetone (Green Chem., 2012, 14, 3260).

There is also disclosed a method for treating an epoxy resin composite material with a treatment solution containing a dewatered alkali metal compound and an organic solvent (Japanese Patent Application Publication No. 2005-255899).

It is also disclosed that an epoxy resin prepolymer is allowed to be in contact with an aprotic organic solvent having a dipolar moment of 3.0 or more so that the epoxy resin prepolymer may be dissolved in the solvent (Japanese Patent Application Publication No. 2013-107973).

Further, there is also disclosed use of an organic solvent including furan-2-carbaldehyde as extraction solvent or cracking solvent for separating carbon fibers from CFRP (US Patent Application Publication No. 2014-0023581).

The methods according to the related art disclose that decomposition of epoxy may be carried out by using an organic solvent under a mild condition at a relatively low temperature.

However, the methods according to the related art are using organic solvent reaction systems which adopt an organic solvent itself as their main key for dissolving an epoxy resin. Herein, since the organic solvent itself functions as contaminant source, such organic solvent reaction systems have a fundamental limit in that a problem of pollution caused by the organic solvent should be solved. In addition, such methods according to the related art have low applicability to sparingly decomposable epoxy resins or require a large amount of energy, resulting in unsatisfactory reaction efficiency.

SUMMARY

The present disclosure is directed to providing a method for depolymerization of a cured epoxy resin material, which may allow depolymerization of a cured epoxy resin material at a temperature of 200° C. or lower, specifically 100° C. or lower, in a very simple and rapid manner and reduce a processing cost and an energy requirement, and a composition used for the method.

The present disclosure is also directed to providing a method for depolymerization of a cured epoxy resin material, which may substitute for an organic solvent reaction system using an organic solvent as a main solvent and thus minimize environmental contamination or pollution caused by an organic solvent functioning as a separate contamination source, and a composition used for the method In addition, the present disclosure is directed to providing a method for depolymerization of a cured epoxy resin material, which may provide increased efficiency of depolymerization of a cured epoxy resin material without using organic solvent reaction system which adopts an organic solvent as a main solvent, and a composition used for the method.

In addition, the present disclosure is directed to providing a method for depolymerization of a cured epoxy resin material, which may allow easy decomposition of a cured epoxy resin material having relatively high difficulty in decomposition, and a composition used for the method.

Further, the present disclosure is directed to providing a method for recovering a filler from a cured epoxy resin material which may prevent degradation of the properties of the filler after decomposing the cured epoxy resin material to provide a recycled filler having excellent properties, and a filler obtained by the method.

In one aspect, there is provided a composition for depolymerization of a cured epoxy resin material, comprising: a transition metal salt or a transition metal oxide containing a transition metal element; and a reaction solvent. Herein an oxidation of the chemical bonds such as carbon-carbon bonds of the cured epoxy resin material is able to occur by the medium of the transition metal in the reaction solvent. Further, the transition metal salt is able to be dissociated in the reaction solvent.

In example embodiments, the reaction solvent may have a dielectric constant of at least 65, at least 70, at least 75, or at least 80.

In example embodiments, the reaction solvent may be a $H_2O$-based reaction solvent that comprises $H_2O$ and has a dielectric constant of at least 65, at least 70, at least 75, or at least 80.

In example embodiments, $H_2O$ may be in a liquid, gaseous or supercritical state.

In example embodiments, the reaction solvent may be water alone.

In example embodiments, the composition may show a pH of 1-14 or 3-12.

In example embodiments, the transition metal may be at least one selected from the group consisting of Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, and Hg.

In example embodiments, the transition metal salt or the transition metal oxide may be at least one selected from the group consisting of $KMnO_4$, $MnO_2$, $K_2MnO_4$, $MnSO_4$, $CrO_3$, $Na_2Cr_2O_7$, $K_2Cr_2O_7$, $ZnCr_2O_7$, $H_2CrO_4$, pyridinium chlorochromate, pyridinium dichromate, $V_2O_5$, $RuCl_3$, $RuO_2$, tetrapropylammonium perruthenate, $MoO_3$, $K_3[Fe(CN)_6]$, $FeCl_3$, $Fe(NO_3)_3$ nonahydrate, $MeReO_3$, $CuCl$, $Cu(ClO_4)_2$, $Cu(HCO_2)_2Ni(HCO_2)_2$, $Cu(OAc)_2$, $OsO_4$, and $(NH_4)_2Ce(NO_3)_6$.

In example embodiments, the transition metal salt or the transition metal oxide may be used in an amount of 0.001-99 wt % based on the weight of the composition for depolymerization.

In another aspect, there is provided a method for depolymerization of a cured epoxy resin material, comprising depolymerizing the cured epoxy resin material by using the said composition for depolymerization.

In still another aspect, there are provided a method for separating a filler from a cured epoxy resin material, comprising: depolymerizing a cured epoxy resin material by using the said composition for depolymerization of a cured epoxy resin material; and recovering a filler from the depolymerized cured epoxy resin material, and there is further provided a filler separated by the method.

In example embodiments, the depolymerization may be carried out at a temperature of 20-200° C. or 20-100° C.

In example embodiments, the cured epoxy resin material may be used in an amount of 1-90 parts by weight based on 100 parts by weight of the composition for depolymerization.

In example embodiments, the method may further comprises repeating depolymerization by adding a new cured epoxy resin material to the reaction solvent remaining after depolymerizing the cured epoxy resin material.

In example embodiments, the method may further comprises pretreating the cured epoxy resin material before subjecting the cured epoxy resin material to depolymerization in such a manner that the cured epoxy resin material has an increased reaction surface area.

In example embodiments, the pretreatment may be physical pretreatment, chemical pretreatment or a combination thereof. The physical pretreatment may be at least one selected from dry crushing and wet crushing. The chemical pretreatment may be carried out by dipping the cured epoxy resin material into an acidic composition having a pH less than 7.

In example embodiments, a filler obtained after the depolymerization may have a transition metal remaining therein.

According to example embodiments of the present disclosure, it is possible to carry out depolymerization of a cured epoxy resin material at a temperature of 200° C., specifically 100° C. or lower, and to reduce a processing cost and an energy requirement. It is also possible to substitute for a reaction system using an organic solvent as a main solvent, so that the contamination problems caused by the organic solvent functioning as separate contamination source may be solved and environmental contamination or pollution may be minimized. In addition, it is possible to increase depolymerization efficiency without using a reaction system based on an organic solvent as a main solvent. As well, it is possible to decompose a cured epoxy resin material having relatively high difficulty in decomposition with ease. Further, it is also possible to prevent degradation of properties of a filler recovered after decomposition of the cured epoxy resin material and thus to obtain recycled filler having excellent properties.

BRIEF DESCRIPTION OF THE DRAWINGS

The above and other aspects, features and advantages of the disclosed example embodiments will be more apparent from the following detailed description taken in conjunction with the accompanying drawings in which:

FIG. 8B shows results of X-ray photoelectron spectroscopy (XPS) of carbon fibers recovered after carrying out depolymerization (denoted as R-CF) using $KMnO_4$ in Experiment 3.

FIG. 8C shows results of XPS elemental contents of carbon fibers (denoted as CF) used in CFRP and the carbon fibers recovered after carrying out depolymerization (denoted as R-CF) using $KMnO_4$ in Experiment 3.

DETAILED DESCRIPTION

Figure 1:
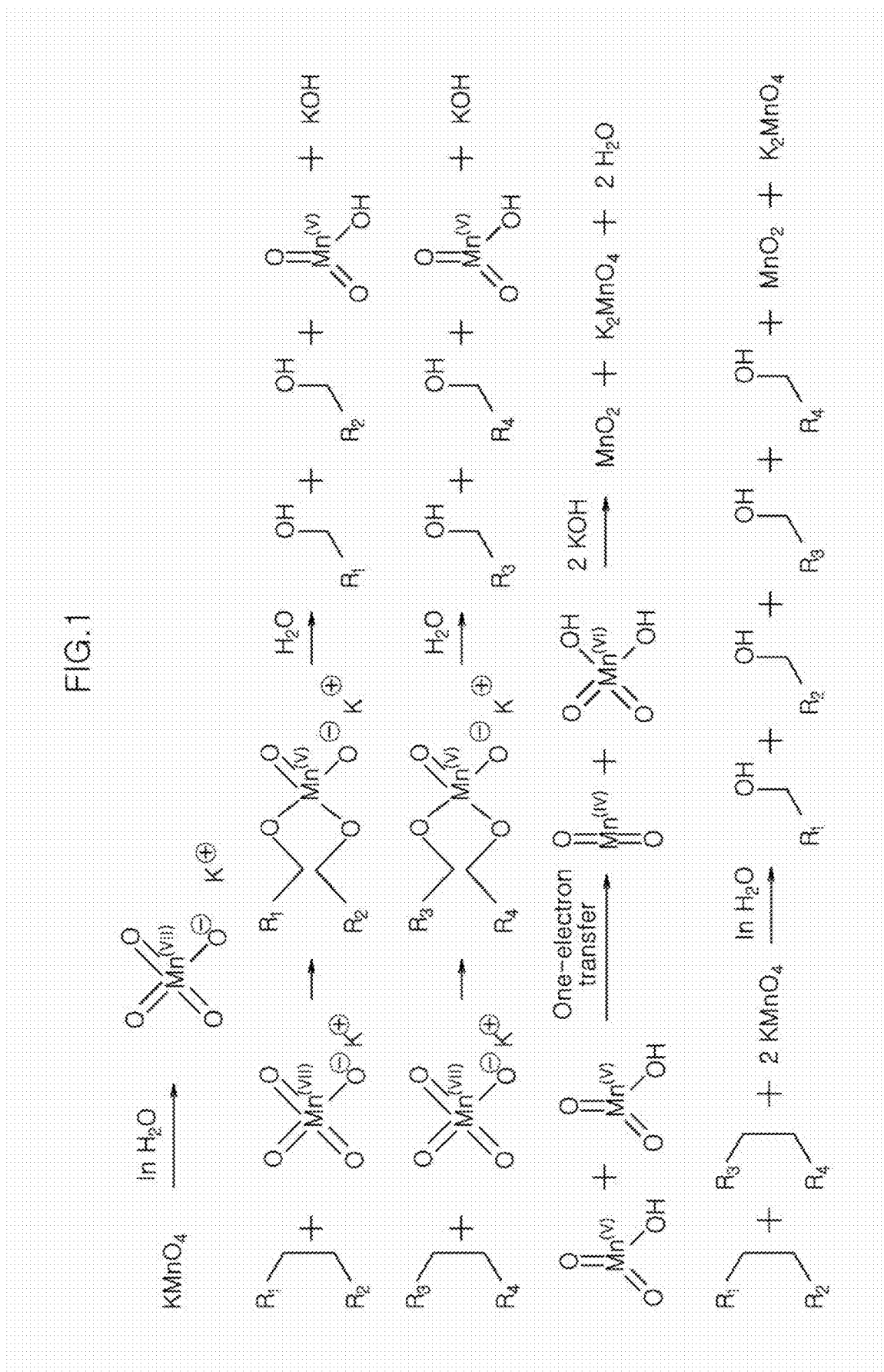
FIG. 1 is an example reaction scheme 1 showing an oxidation of the chemical bonds such as carbon-carbon bonds of the cured epoxy resin material.

Example embodiments are described more fully hereinafter. The invention may, however, be embodied in many different forms and should not be construed as limited to the example embodiments set forth herein. Rather, these example embodiments are provided so that this disclosure will be thorough and complete, and will fully convey the scope of the invention to those skilled in the art. In the description, details of features and techniques may be omitted to more clearly disclose example embodiments.

The terminology used herein is for the purpose of describing particular embodiments only and is not intended to be limiting of the invention. In the present disclosure, the singular forms "a," "an" and "the" are intended to include the plural forms as well, unless the context clearly indicates otherwise. Furthermore, the use of the terms a, an, etc. do not denote a limitation of quantity, but rather denote the presence of at least one of the referenced item. The terms "first," "second," and the like do not imply any particular order, but are included to identify individual elements. Moreover, the use of the terms first, second, etc. do not denote any order or importance, but rather the terms first, second, etc. are used to distinguished one element from another.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Definition of Terms

In the present disclosure 'cured epoxy resin material' means an epoxy resin or various composite materials including an epoxy resin. In addition, 'cured epoxy resin material' may also include not only a fully cured epoxy resin but also a partially cured epoxy resin or an intermediate (such as an epoxy resin prepolymer or prepreg) produced during the curing.

The composite materials may include various fillers and/or various polymer resins. For reference, an epoxy resin may be produced through a curing reaction between an epoxy compound having two or more epoxy groups in its molecule and a curing agent. There is no particular limitation in the epoxy compound and the curing agent. The epoxy compound may include a multifunctional epoxy compound, or the like. In addition, the curing agent may include one having an aromatic group or aliphatic group and may also include a curing agent having at least one selected from the group consisting of an amine group, acid anhydride group, imidazole group and mercaptan group in its molecule.

In the present disclosure, 'oxidation by the medium of a transition metal element' means an oxidation generated when a part of electrons forming a chemical bond, such as a carbon-carbon bond, of an organic compound, such as a cured epoxy resin material, are transferred toward a transition metal through a change in oxidation number of the transition metal.

In the present disclosure, 'filler' means a filled material forming an epoxy composite material together with an epoxy resin.

In the present disclosure, 'polymer resin' means a polymer resin forming an epoxy resin composite material in addition to an epoxy resin.

In the present disclosure, there is no particular phase limitation in reaction solvent. Therefore, the reaction solvent may mostly be in liquid phase but a gaseous phase may also be included as for the reaction solvent phase. In addition, a supercritical phase may also be included as for the reaction solvent phase.

In the present disclosure, $H_2O$ may mostly be in liquid state but is not limited thereto. Further, a gaseous phase may also be included as for $H_2O$ phase. In addition, a supercritical phase may also be included as for $H_2O$ phase.

In the present disclosure, 'aqueous solution' is in a liquid phase as long as it is not specifically directed to be in a gaseous state or a supercritical state. In addition, the term 'aqueous solution' has water alone as for its solvent as long as it is not specifically stated that any other solvent is also mixed together.

In the present disclosure, 'organic solvent reaction system' means a reaction system using an organic solvent as a main solvent for the decomposition of a cured epoxy resin material.

In the present disclosure, '$H_2O$ reaction system' means a reaction system using $H_2O$ as a main solvent for the decomposition of a cured epoxy resin material. It is opposed to an organic solvent reaction system and refers to use of a $H_2O$-based reaction solvent during depolymerization. Although the $H_2O$-based reaction solvent may include a solvent besides $H_2O$ (i.e., it may be used in the form of mixed solvents), it is required that such mixed solvents have a dielectric constant of at least about 65, or preferably at least about 70 or at least about 75 or at least about 80. More preferable example is that the $H_2O$-based reaction solvent is composed of $H_2O$ alone (water has a dielectric constant of about 80.2).

In the present disclosure, 'depolymerization time' means a reaction time required for full depolymerization of a cured epoxy resin material provided for the depolymerization reaction. Herein, the full depolymerization means that residual cured epoxy resin material (solid) is not present substantially (i.e., residue ratio of epoxy resin is 5% or less).

The decomposition ratio of an epoxy resin in a cured epoxy resin material may also be calculated as follows. That is, decomposition ratio (%)=[(epoxy resin content in cured epoxy resin material–epoxy resin residue after decomposition)/(epoxy resin content in cured epoxy resin material)]× 100. Then, the residue ratio of epoxy resin is 100%– decomposition ratio.

In the present disclosure, the expression 'cured epoxy resin material having relatively more difficulty in decomposition' means a cured epoxy resin material using a sparingly decomposable epoxy compound (monomer) and/or curing agent. For example, a multicyclic novolak resin has relatively more difficulty in decomposition as compared to BPA. Further, for example, an aromatic curing agent or acid anhydride-based curing agent has relatively more difficulty in decomposition as compared to an aliphatic curing agent.

In the present disclosure, a dielectric constant may be determined by using a dielectric constant meter.

Description of Example Embodiments

Hereinafter, example embodiments of the present disclosure will be described.

In one aspect, there is provided a composition for depolymerization of a cured epoxy resin material, the composition including a transition metal salt or a transition metal oxide containing a transition metal (metal element that belongs to Groups 3-12 in the Periodic Table) and a reaction solvent, as well as a method for depolymerization of a cured epoxy resin material by using the composition.

Surprisingly, it has been found by the present inventors that a cured epoxy resin material may be depolymerized easily and rapidly in the composition including the said compound in combination with a reaction solvent (particularly, $H_2O$-based solvent) without using an organic solvent-based reaction system.

It is though that selection of a reaction solvent and a compound used in combination with the reaction solvent is important in order to carry out depolymerization of a cured epoxy resin material and to increase reaction efficiency under a low-temperature mild condition. In addition, as described hereinafter further in detail, it is thought to be important to control a dielectric constant of the reaction solvent to be a specified value or more to allow for the compound to depolymerize a cured epoxy material while increasing depolymerization efficiency.

When carrying out depolymerization according to example embodiments of the present disclosure, an oxidation occurs by the medium of a transition metal element in the reaction solvent. It is thought that the cured epoxy resin material is depolymerized while the chemical bonds such as carbon-carbon bonds forming the cured epoxy resin material are broken through such oxidation. Further, it is required to control a dielectric constant of the reaction solvent to be a specified value or more in order to carry out such oxidation at a low energy.

Therefore, according to example embodiments, it is required for the reaction solvent to have a dielectric constant of at least 65, at least 70, at least 75 or at least 80 in order to increase reaction efficiency.

In an example embodiment, the reaction solvent may be a $H_2O$-based reaction solvent. When depolymerizing a cured epoxy resin material by using a composition including a transition metal salt or a transition metal oxide containing a transition metal, the dielectric constant of the $H_2O$-based solvent used in combination with the compound may affect the depolymerization efficiency of the cured epoxy resin material.

It is thought that this is because the $H_2O$-based reaction solvent stimulates dissolution and ionic dissociation and participates in oxidation of the chemical bonds such as carbon-carbon bonds in the cured epoxy resin material by the medium of a transition metal element, and thus affects the epoxy resin depolymerization efficiency, as opposed to an organic solvent in an organic solvent reaction system.

In an example embodiment, it is required that the $H_2O$-based reaction solvent has a dielectric constant of at least 65, or at least 70, or at least 75 or at least 80. Particularly, it is preferable that the $H_2O$-based reaction solvent is $H_2O$ alone (dielectric constant of water is about 80.2). When $H_2O$ is used alone as $H_2O$-based reaction solvent, the decomposition efficiency of a cured epoxy resin material increases rapidly (see, Experiment 2 hereinafter).

On the contrary, in the organic solvent-based reaction system according to the related art, an organic solvent is used as a main solvent for dissolving a cured epoxy resin product directly.

However, even when introducing a transition metal salt or a transition metal oxide to an organic solvent, it is not possible for the transition metal salt or the transition metal oxide to contribute to the depolymerization of the cured epoxy resin material due to very low solubility and/or ionic dissociation degree. For example, in case of NMP, it has a dielectric constant of 32 and a transition metal salt or a transition metal oxide is barely dissolved in NMP.

In this regards, the decomposition efficiency of a cured epoxy resin material as a function of dielectric constant is observed by the present inventors. For example, it is shown that a transition metal salt having an ionic bond shows different dissociation behavior and reactivity in water and in an organic solvent, which leads to a difference in decomposition efficiency of a curd epoxy resin material.

It is thought that the reason why such different decomposition efficiency is observed is that there are differences in solubility and/or oxidation activity of the transition metal salt or the transition metal oxide in water and in an organic solvent.

For example, regarding a difference in solubility, a difference in polarity (i.e. dielectric constant) between water and an organic solvent may cause a difference in solubility of the ionically bonded transition metal salt. This is because the dipole-ion binding force of a solvent should be larger than the ion-ion lattice energy of an ionically bonded material in order to dissociate ions.

Meanwhile, a transition metal salt or a transition metal oxide may oxidize an organic compound, i.e., a cured epoxy resin material in example embodiments of the present disclosure, by withdrawing electrons from the chemical bonds such as carbon-carbon bonds thereof, while the transition metal salt or the transition metal oxide itself is reduced. Explaining further in detail, as opposed to an alkali metal having an oxidation number of +1 or an alkaline earth metal having an oxidation number of +2, a transition metal may have at least two different oxidized forms (oxidation numbers), which may undergo a change thereof (i.e., a decrease in oxidation number) during the reaction to cause an oxidation reaction. For example, in case of manganese in potassium permanganate which is a transition metal salt (see the reaction scheme 1 of FIG. 1), it may have the three different oxidation numbers of +7 (potassium permanganate), +6 (potassium manganate) and +4 (manganese dioxide). Thus, an oxidation reaction may occur wherein the manganese withdraws electrons from the chemical bonds such as carbon-carbon bonds of the organic compound, cured epoxy resin material so as that the relatively unstable oxidized form of manganese having an oxidation number of +7 is changed into the stable oxidized form of manganese having an oxidation number of +4 during the reaction.

This is different from the mechanism in which a peroxidized anion, such as NaOCl, causes an oxidation reaction. In addition, use of potassium phosphate is based on a transesterification reaction using a base, not oxidation, and thus is different from the mechanism disclosed herein.

As described hereinafter, in example embodiments, a solvent having a high dielectric constant of a specific value or more may be used so that the transition metal salt composition present in the form of salt is dissolved well, the metal is dissociated with ease and an oxidation reaction is facilitated.

Based on the above description, it is required to use a solvent having a high dielectric constant, specifically a $H_2O$-based solvent for depolymerization in order to allow effective dissolution of a transition metal salt and to stimulate an oxidation reaction. In addition, when using an organic solvent, problems including contamination caused by the organic solvent and recycle problems of the organic solvent occur. Thus, in the environmental aspects as well, $H_2O$-based solvent is preferable, and $H_2O$ solvent alone is more preferable (100 wt % or 100 vol % of $H_2O$ in the reaction solvent).

The depolymerized product (e.g. carbon fibers) obtained by the oxidation as described above has OH groups. Therefore, in another aspect, there is provided a depolymerized product of a cured epoxy resin material, wherein the depolymerized product contains OH groups. For reference, Experiment 1 described hereinafter shows results of FT-IR analysis of such a depolymerized product having OH groups formed. This analysis results suggests that a lot of OH groups are produced by the depolymerization according to example embodiments of the present disclosure.

When carrying out depolymerization of a cured epoxy resin material by using the composition for depolymerization of a cured epoxy resin material as described above, it is possible to treat a waste cured epoxy resin material very simply and rapidly under a mild condition at a temperature of 200° C. or lower, particularly 100° C. or lower with a smaller energy requirement, as opposed to the related art. This shows that the reaction temperature is decreased largely as compared to the conventional pyrolysis process (about 200-400° C.).

Further, it can be seen that the reaction efficiency of the example embodiments is significantly high as compared to a different combination of a reaction solvent with a compound, for example, Comparative Example 1 (not dissolved) using a combination of aqueous potassium permanganate with acetone wherein a dielectric constant is low due to the use of the organic compound, acetone, or Comparative Example 2 (reaction time: 12 hours) using an aqueous nitric acid solution. Moreover, as opposed to the organic solvent-based reaction systems according to the related art, the method disclosed herein uses a $H_2O$-based reaction system and thus may avoid a need for an organic solvent harmful to the human body, resulting in an environmental advantage.

Furthermore, it is possible to separate and recycle a filler material contained in a cured epoxy resin material with ease through the above-described treatment according to the example embodiments. The obtained filler may be prevented from degradation of properties even though it has been subjected to a decomposition process, and thus has much advantage in recycling.

In an example embodiment, particular examples of the transition metal salt or transition metal oxide containing a transition metal element may include $KMnO_4$, $MnO_2$, $K_2MnO_4$, $MnSO_4$, $CrO_3$, $Na_2Cr_2O_7$, $K_2Cr_2O_7$, $ZnCr_2O_7$, $H_2CrO_4$, pyridinium chlorochromate, pyridinium dichromate, $V_2O_5$, $RuCl_3$, $RuO_2$, tetrapropylammonium perruthenate, $MoO_3$, $K_3[Fe(CN)_6]$, $FeCl_3$, $Fe(NO_3)_3$ nonahydrate, $MeReO_3$, $CuCl$, $Cu(ClO_4)_2$, $Cu(HCO_2)_2Ni(HCO_2)_2$, $Cu(OAc)_2$, $OsO_4$, $(NH_4)_2Ce(NO_3)_6$, or the like. As described above, it is preferred to use a transition metal salt or a transition metal oxide having a high oxidation capability in order to carry out depolymerization by withdrawing electrons from the chemical bonds such as carbon-carbon bonds of the cured epoxy resin material. In this context, potassium permanganate, a strong oxidizing agent, may be preferable. In addition, potassium permanganate may be preferable since it has high applicability and is inexpensive.

Meanwhile, when carrying out depolymerization by using a transition metal salt or a transition metal oxide containing a transition metal according to example embodiments, oxidation for depolymerization may be performed by the medium of the transition metal as described above. Thus, the transition metal may remain in the filler obtained as the reaction product.

For example, when carrying out depolymerization of a cured epoxy resin material by using potassium permanganate, manganese may remain in the filler obtained after depolymerization. Thus, after carrying out elemental analysis of the filler, a trace amount of transition metal (i.e. manganese) is detected.

In an example embodiment, it is particularly preferred that the $H_2O$-based reaction solvent may be aqueous solution ($H_2O$ alone), as described above.

In an example embodiment, the $H_2O$-based reaction solvent may be controlled to have a pH condition of 1 or higher so that it be weak acidic, neutral or basic. It is thought that when controlling the pH condition as mentioned above, the oxidation reaction may occur with ease in the $H_2O$-based reaction system.

In a non-limiting example, the $H_2O$-based reaction system has a pH of 1-14, more particularly 3-12 in view of reactivity.

In an example embodiment, the depolymerization may be carried out at a temperature less than 250° C. (e.g. 20° C. or higher and less than 250° C.), or 200° C. or lower (e.g. 20-200° C.), or 100° C. or lower (e.g. 20-100° C. or 20-70° C.).

In an example embodiment, the $H_2O$-based reaction solvent may be a liquid phase, gaseous phase or supercritical phase. The process may be simple and the energy requirement may be low if a liquid phase is used. Although a liquid phase is used in example embodiments of the present disclosure, depolymerization may be carried out rapidly at a low temperature. However, a gaseous phase or supercritical phase may be used intentionally. Such a supercritical phase may further reduce reaction time but require a complicated reaction system and process.

In an example embodiment, a process for pretreating a cured epoxy resin material before it is subjected to depolymerization may be further carried out so as that the reaction surface area of the cured epoxy resin material is increased. As described above, according to the example embodiments of the present disclosure, it is possible to reduce reaction time significantly at a low temperature with no need for a separate pretreatment process. However, it is possible to reduce reaction time further more through the pretreatment for increasing the reaction surface area. That is, it is possible to facilitate the subsequent depolymerization by increasing the reaction area of the cured epoxy resin material through such pretreatment.

In an example embodiment, the pretreatment may include physical pretreatment, chemical pretreatment or a combination thereof.

In a non-limiting example, the physical pretreatment may be crushing. The crushing may be at least one selected from dry crushing and wet crushing and may be carried out by using at least one selected from the group consisting of a hammer mill, cutter mill, flake crusher, feather mill, pin type crusher, impact crusher, microcrusher, jet mill, micron mill, ball mill, meteor mill, hydro mill and an auqarizer. The cured epoxy resin material crushed according to an example embodiment may have a size of 1 μm-10 cm.

In a non-limiting example, the chemical pretreatment may be carried out by dipping a cured epoxy resin material into an acidic composition having a pH less than 7.

In a non-limiting example, the acidic composition used for dipping may have a pH of 5.0 or less and a temperature of 20-250° C. The cured epoxy resin material may be separated from the acidic composition 0.1-24 hours after it is dipped in the acidic composition. Then, the separated cured epoxy resin material may be washed.

In an example embodiment, the cured epoxy resin material to be decomposed may include various fillers and/or polymer resins.

In an example embodiment, the filler may be at least one selected from the group consisting of carbon fibers or other graphite, graphene, graphene oxide, reduced graphene, carbon nanotubes, glass fibers, inorganic salts, metal particles, ceramic materials, single molecular organic compounds, single molecular silicon compounds and silicone resins.

In an example embodiment, the polymer resin may be at least one selected from the group consisting of an acrylic resin, olefin resin, phenol resin, natural rubber, synthetic rubber, aramid resin, polycarbonate, polyethylene terephthalate, polyurethane, polyamide, polyvinyl chloride, polyester, polystyrene, polyacetal, acrylonitrile butadiene styrene and styrene acrylonitrile.

In an example embodiment, the transition metal salt or the transition metal oxide may be used in an amount of 0.001-99 wt % based on the total weight of the composition ($H_2O$-based reaction solvent+transition metal salt or the transition metal oxide). In a non-limiting example, when the $H_2O$-based reaction solvent is an aqueous solution, the transition metal salt or the transition metal oxide may be used in an amount of 0.001-99 wt % based on the total weight of the aqueous solution containing the transition metal salt or the transition metal oxide.

In an example embodiment, the cured epoxy resin material may be used in an amount of 1-90 parts by weight based on 100 parts by weight of the composition for depolymerization ($H_2O$-based reaction solvent+transition metal salt or the transition metal oxide). In a non-limiting example, when the $H_2O$-based reaction solvent is an aqueous solution, the cured epoxy resin material may be used in an amount of 1-90 parts by weight based on 100 parts by weight of the aqueous solution containing the transition metal salt or the transition metal oxide.

In an example embodiment, when the transition metal oxide is $MnO_2$, it is possible to provide a cured epoxy resin material with the composition for depolymerization by bubbling oxygen gas into water to obtain aqueous $KMnO_4$ solution and introducing the cured epoxy resin material thereto.

Meanwhile, in still another aspect, there is provided a method for separating a filler from a cured epoxy resin material, including: carrying out depolymerization of a cured epoxy resin material by using a composition for depolymerization including a transition metal salt or a transition metal oxide containing a transition metal and a reaction solvent; and recovering a filler from the depolymerized cured epoxy resin material through filtering or extraction.

The filler separated and recovered from the cured epoxy resin material may be prevented from degradation of properties as compared to one before used in the cured epoxy resin material. Thus, it is possible to obtain recycled filler having excellent properties.

For example, as can be seen from the following examples, when the filler is carbon fibers, it may show degradation of properties, such as tensile strength or elongation, of about 13% or less, or 10% or less, as compared to the carbon fiber raw material contained in the cured epoxy resin material. For reference, when carbon fibers are recovered from CFRP through a pyrolysis process, they show a drop in tensile strength of about 15% or more as compared to the carbon fiber raw material (Mater. Res. Bull. 2004, 39, 1549). On the contrary, when carrying out depolymerization according to the example embodiments of the present disclosure, it is possible to recover carbon fibers while minimizing degradation of tensile strength of carbon fibers.

In an example embodiment, in the method, it is possible to repeat decomposition of a new cured epoxy resin material by adding the cured epoxy resin material to the $H_2O$-based reaction solvent remaining after depolymerization.

In addition, it is possible to separate filler from the product obtained by depolymerization of a cured epoxy resin materials disclosed herein through filtering or extraction and washing.

Hereinafter, the present disclosure will be described in detail through examples. However, the following examples are for illustrative purposes only and it will be apparent to those of ordinary skill in the art that the scope of the present disclosure is not limited by the examples.

EXPERIMENT 1

Water is used alone as a reaction solvent in the following examples. All of the examples, except the supercritical aqueous solution of Example 2, use aqueous solution (liquid phase). Water has a dielectric constant of 80.2.

Meanwhile, Comparative Example 1 uses a mixed solvent of water with acetone and the mixed solvent has a dielectric constant of about 44. In Comparative Example 2, aqueous nitric acid solution is used.

Meanwhile, Example 3 uses waste CFRP in an amount of 15 times of the amount of waste CFRP used in Example 1. Example 4 uses waste CFRP in the same amount as Example 3 while using an increased amount of aqueous potassium permanganate solution.

In addition, Example 5 includes depolymerization of waste CFRP after crushing. In Example 6, depolymerization of waste CFRP is carried out after dipping in acetic acid. In Example 7, depolymerization of waste CFRP is carried out after crushing and dipping in acetic acid.

Further, Example 8 uses chrome (VI) oxide ($CrO_3$) as a transition metal oxide, Example 9 uses vanadium pentaoxide ($V_2O_5$) as a transition metal oxide, and Example 10 uses ruthenium chloride ($RuCl_3$) as a transition metal salt. Example 11 uses molybdenum oxide ($MoO_3$) as a transition metal oxide, Example 12 uses methyl rhenium trioxide (MTO) as a transition metal oxide, and Example 13 uses osmium tetraoxide ($OsO_4$) as a transition metal oxide.

EXAMPLE 1

Depolymerization of Cured Epoxy Resin Material in CFRP Using Aqueous Potassium Permanganate ($KMnO_4$) Solution and Separation of Filler (Carbon Fibers)

The cured epoxy resin material used in Example 1 is waste CFRP. The waste CFRP includes a cured epoxy resin material obtained by using a bisphenol A diglycidyl ether type epoxy compound containing a halogen atom and an aromatic curing agent containing an aromatic amine group, and carbon fibers. Such CFRP uses an aromatic curing agent, and thus it is known that such CFRP has relatively high difficulty in decomposition.

0.1 g of waste CFRP is introduced to 70 mL of 2 mol/L aqueous potassium permanganate solution contained in an open glass container, followed by agitation at 70° C. No autoclave is used.

Figure 2A:
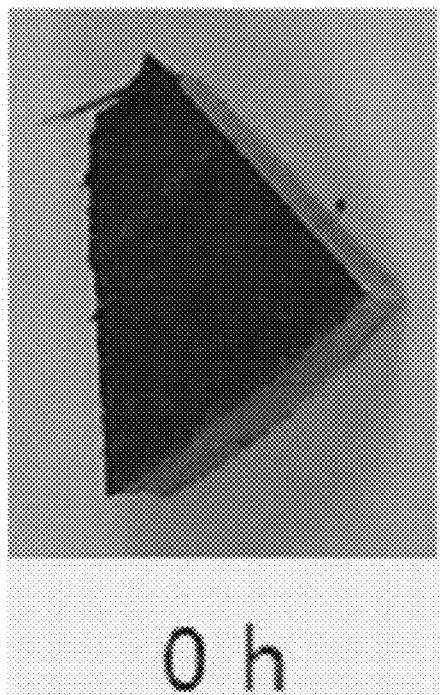
FIG. 2A is a photograph illustrating CFRP before carrying out depolymerization in Example 1.
Figure 2B:
FIG. 2B is a photograph illustrating carbon fibers recovered in Example 1.
Figure 3:
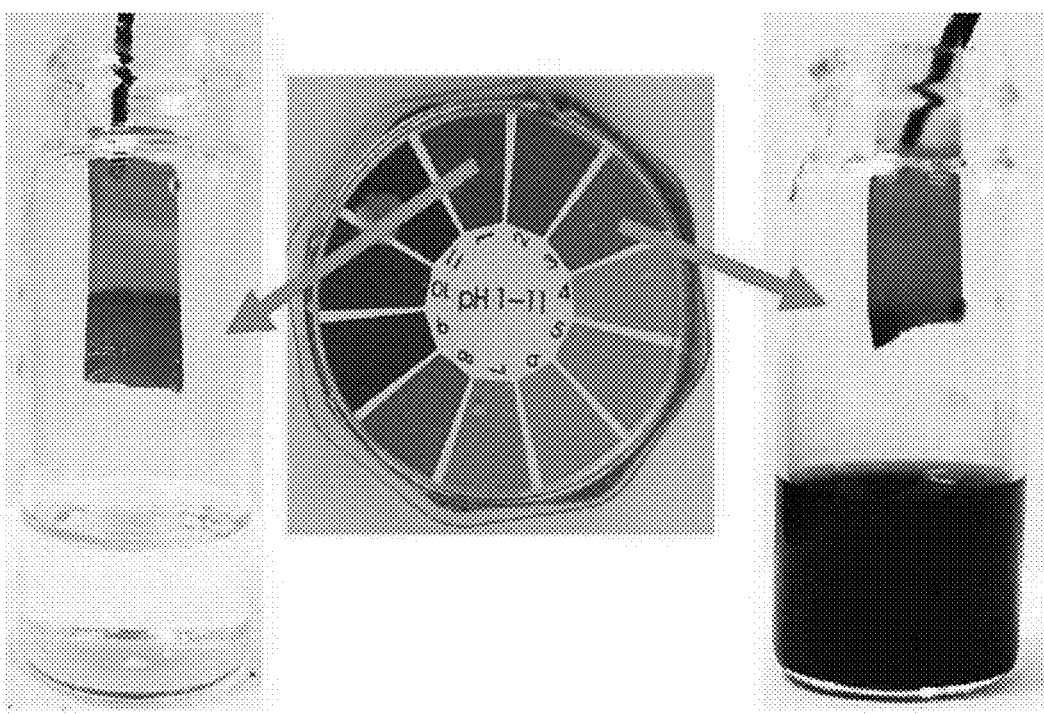
FIG. 3 shows results of pH measurement of aqueous potassium permanganate which is the reaction system of Example 1 and aqueous nitric acid solution which is the reaction system of Comparative Example 3.

FIG. 2A is a photograph illustrating CFRP before carrying out depolymerization in Example 1. FIG. 2B is a photograph illustrating carbon fibers recovered in Example 1. FIG. 3 shows results of pH measurement of aqueous potassium permanganate which is the reaction system of Example 1.

Figure 4:
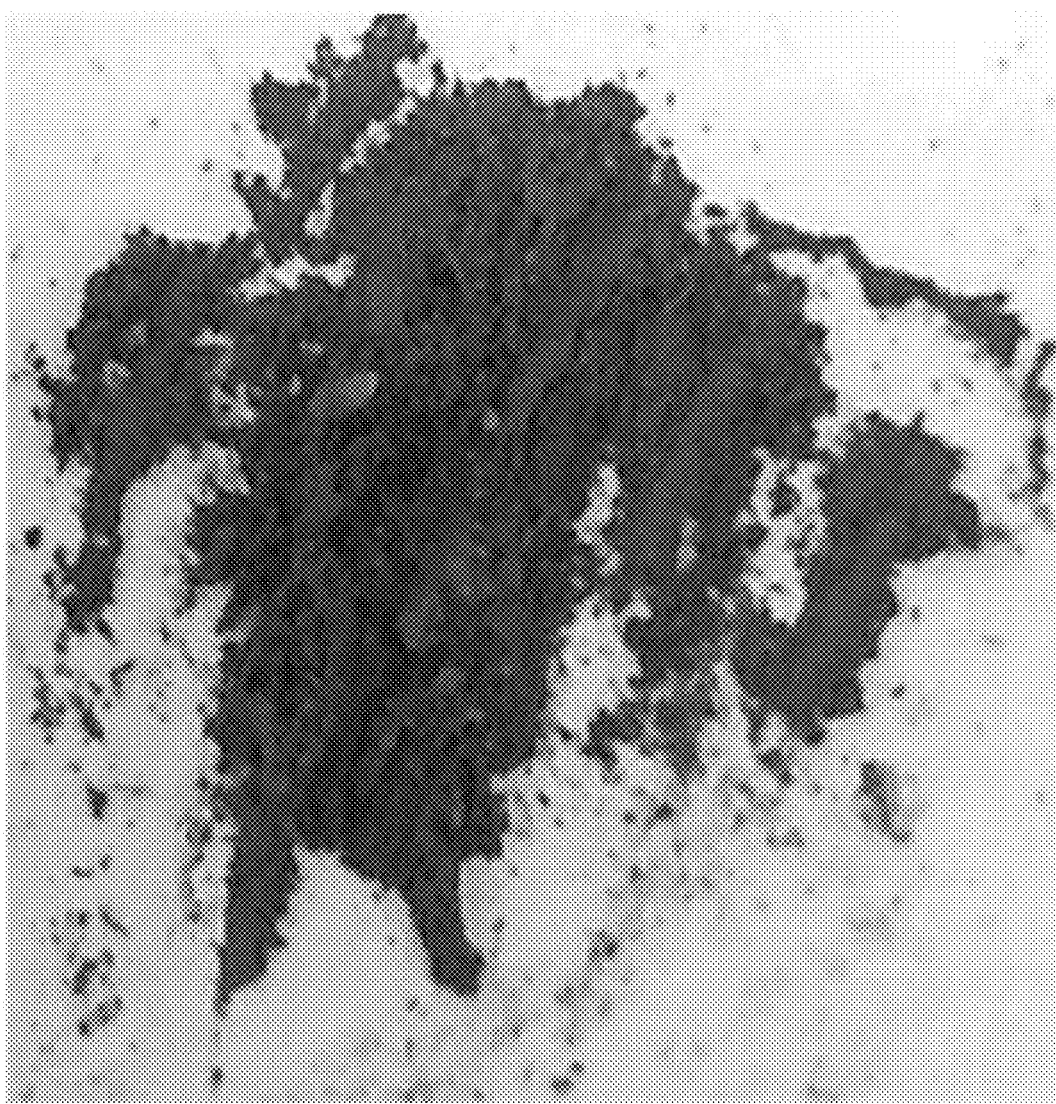
FIG. 4 is a photograph illustrating manganese dioxide produced by the depolymerization in Example 1, after it is filtered and separated.

FIG. 4 is a photograph illustrating manganese dioxide produced by the depolymerization in Example 1, after it is filtered and separated.

Figure 5:
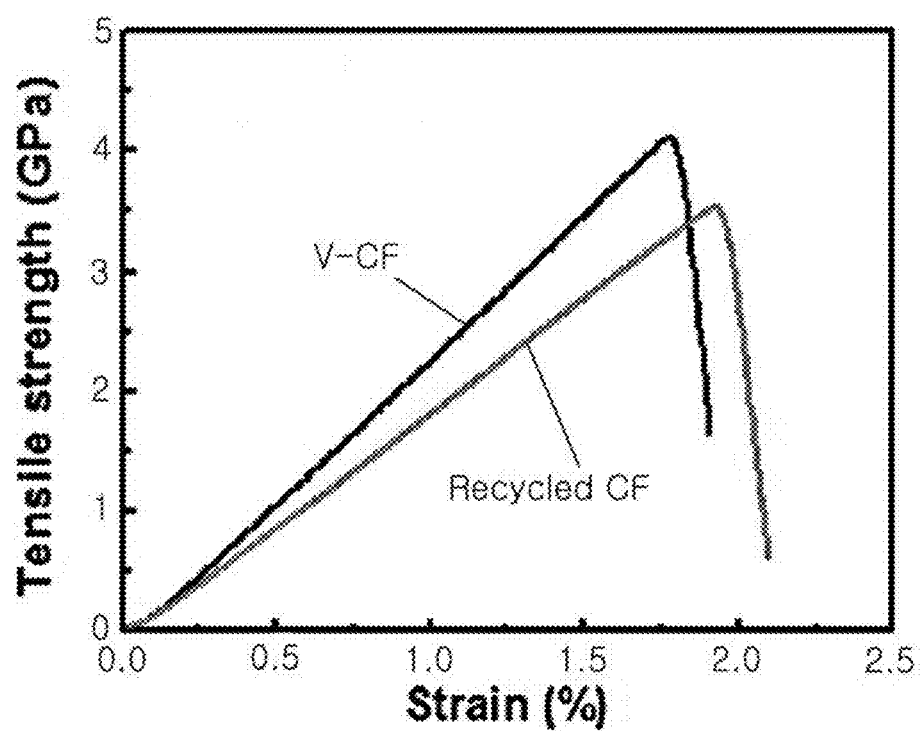
FIG. 5 is a graph illustrating results of tensile strength measurement of the carbon fibers (carbon fiber raw materials, denoted as V-CF) used for CFRP in Example 1 as compared to the carbon fibers recovered (denoted as Recycled CF) in Example 1.

In addition, the time when depolymerization of an epoxy resin is completed is shown in Table 1, the results of pH of aqueous potassium permanganate solution measured after carrying out depolymerization of an epoxy resin are shown in Table 2, and variations in tensile strength of carbon fibers before and after depolymerization are shown in Table 3 and FIG. 5.

After 3 hours, it is shown that the epoxy resin is substantially completely depolymerized (residual ratio: 5% or less). Then, the carbon fibers and manganese dioxide in aqueous solution are filtered by using cellulose filter paper available from Advantec Co. After that, the carbon fibers are separated, washed and dried. It is determined that no epoxy residue is present through the results of thermogravimetric analysis (TGA) of the dried carbon fibers.

Figure 6:
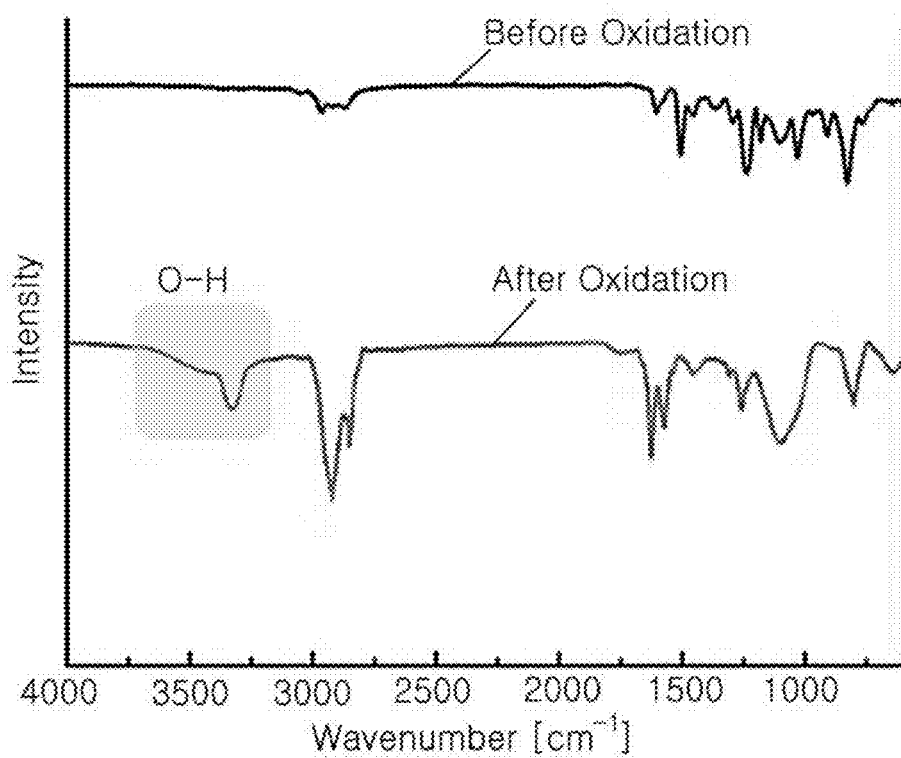
FIG. 6 shows results of FT-IR analysis for CFRP before it is depolymerized (denoted as Before Oxidation) and results of FT-IR analysis for a solid mixture obtained by extracting and drying the aqueous solution type product remaining after filtering carbon fibers and manganese dioxide (denoted as After Oxidation) in Example 1.

In addition, FT-IR analysis of CFRP before depolymerization and that of the depolymerized product are also carried out in order to determine that the depolymerized product according to Example 1 has a lot of C—OH bonds. The results are shown in FIG. 6.

The depolymerized product is a solid mixture obtained by carrying out extraction of the aqueous solution type product remaining after filtering the carbon fibers and manganese oxide in Example 1 with dichloromethane, followed by drying. In case of FT-IR, Nicolet iS 10 instrument available from ThermoScientific Company is used, and pellets are formed by using the solid mixture and potassium bromide and determination is carried out in a wavenumber range of 500 $cm^{-1}$ to 4000 $cm^{-1}$. It can be seen from the FT-IR results that a lot of OH groups are produced.

EXAMPLE 2

Depolymerization of Cured Epoxy Resin Material in CFRP Using Supercritical Aqueous Potassium Permanganate ($KMnO_4$) Solution and Separation of Filler (Carbon Fibers)

0.1 g of the same CFRP as used in Example 1 is introduced to 70 mL of 2 mol/L aqueous potassium permanganate solution contained in a batch reactor equipped with a pressure gauge, and the reactor is sealed and heated with an electric heating jacket to 374° C. At that time, the pressure displayed on the pressure gauge is 221 bar.

After 1 hour, the reactor is cooled to room temperature and it is determined whether CFRP in the reactor is depolymerized or not.

Then, the time when the depolymerization of epoxy resin is completed is shown in Table 1, wherein reaction time is increased at an interval of 1 hour.

After 2 hours, it is shown that the epoxy resin is substantially completely depolymerized. Then, the carbon fibers and manganese dioxide in the reactor are filtered, and the carbon fibers are separated, washed and dried.

EXAMPLE 3

Depolymerization of Cured Epoxy Resin Material in CFRP Using Aqueous Potassium Permanganate ($KMnO_4$) Solution and Separation of Filler (Carbon Fibers): Amount of CFRP is Increased Meanwhile, Example 1 is repeated (i.e., introduction to 70 mL of 2 mol/L aqueous potassium permanganate solution, agitation at 70° C.), except that waste CFRP is used in an amount increased to 15 times (i.e., 1.5 g) of the amount of waste CFRP in Example 1.

After 10 hours, it is shown that the epoxy resin is substantially completely depolymerized. Then, the carbon fibers and manganese dioxide in aqueous solution are filtered, and the carbon fibers are separated, washed and dried.

The time when the depolymerization of epoxy resin is completed is shown in Table 1.

EXAMPLE 4

Depolymerization of Cured Epoxy Resin Material in CFRP Using Aqueous Potassium Permanganate ($KMnO_4$) Solution and Separation of Filler (Carbon Fibers): Depolymerization Conditions are Changed 1.5 g (the same amount as Example 3) of the same CFRP as used in Example 1 is introduced to 100 mL of 4 mol/L aqueous potassium permanganate solution contained in an open glass container, followed by agitation at 90° C. No autoclave is used.

After 7 hours, it is shown that the epoxy resin is substantially completely depolymerized. Then, the carbon fibers and manganese dioxide in aqueous solution are filtered, and the carbon fibers are separated, washed and dried.

The time when the depolymerization of epoxy resin is completed is shown in Table 1. In addition, the results of measurement of tensile strength for the carbon fibers recovered from Example 4 are shown in Table 3.

EXAMPLE 5

Depolymerization of Cured Epoxy Resin Material in CFRP Using Aqueous Potassium Permanganate ($KMnO_4$) Solution and Separation of Filler (Carbon Fibers): Depolymerization after Crushing CFRP 1.0 kg of waste CFRP is crushed into pieces having an average diameter of 2.0 mm by using Barley Grinder Crusher manual crusher available from Wellbom Company (China) and the other conditions are the same as Example 4.

1.5 g of the crushed pieces of cured epoxy resin material is introduced to 100 mL of 4 mol/L aqueous potassium permanganate solution contained in an open glass container, and agitated at 90° C. No autoclave is used.

After 4 hours, it is shown that the epoxy resin is substantially completely depolymerized. Then, the carbon fibers and manganese dioxide in aqueous solution are filtered, and the carbon fibers are separated, washed and dried.

The time when the depolymerization of epoxy resin is completed is shown in Table 1.

EXAMPLE 6

Depolymerization of Cured Epoxy Resin Material in CFRP Using Aqueous Potassium Permanganate ($KMnO_4$) Solution and Separation of Filler (Carbon Fibers): Depolymerization after Dipping of CFRP 1.5 g of waste CFRP is introduced to 100 mL of 99% acetic acid and heated at 120° C. for 30 minutes and the other conditions are the same as Example 4. The cured epoxy resin material is separated and then washed with 20 mL of acetone, followed by drying.

The dried cured epoxy resin material is introduced to 100 mL of 4 mol/L aqueous potassium permanganate solution contained in an open glass container, and agitated at 90° C. No autoclave is used.

After 5 hours, it is shown that the epoxy resin is substantially completely depolymerized. Then, the carbon fibers and manganese dioxide in aqueous solution are filtered, and the carbon fibers are separated, washed and dried.

The time when the depolymerization of epoxy resin is completed is shown in Table 1. In addition, the results of measurement of tensile strength for the carbon fibers recovered from Example 6 are shown in Table 3.

EXAMPLE 7

Depolymerization of Cured Epoxy Resin Material in CFRP Using Aqueous Potassium Permanganate ($KMnO_4$) Solution and Separation of Filler (Carbon Fibers): Depolymerization after Crushing and Dipping CFRP 1.0 kg of waste CFRP (1.0 kg of cured epoxy resin material) is crushed into pieces having an average diameter of 2.0 mm by using Micro Hammer Cutter Mill automatic crusher available from Glen Creston Company (England) and the other conditions are the same as Example 6.

1.5 g of the crushed cured epoxy resin material is introduced to 100 mL of 99% acetic acid and heated at 120° C. for 30 minutes. Then, the cured epoxy resin material is separated, washed with 20 mL of acetone and dried.

After that, the dried cured epoxy resin material is introduced to 100 mL of 4 mol/L aqueous potassium permanganate solution contained in an open glass container, and agitated at 90° C. No autoclave is used.

After 3 hours, it is shown that the epoxy resin is substantially completely depolymerized. Then, the carbon fibers and manganese dioxide in aqueous solution are filtered, and the carbon fibers are separated, washed and dried.

The time when the depolymerization of epoxy resin is completed is shown in Table 1.

EXAMPLE 8

Depolymerization of Cured Epoxy Resin Material Containing Filler (Graphene) Using Aqueous Chrome (VI) Oxide Solution and Separation of Filler (Graphene)

The cured epoxy resin material used in Example 8 consists of an epoxy resin obtained by using a cresol novolak glycidyl ether type epoxy compound and a curing agent containing an aromatic amine group, and graphene.

0.1 g of the cured epoxy resin material is introduced to 70 mL of 2 mol/L aqueous chrome oxide solution contained in an open glass container, and agitated at 70° C. No autoclave is used.

After 6.5 hours, it is shown that the epoxy resin is substantially completely depolymerized. Then, the graphene and chrome (III) oxide in aqueous solution are filtered, and the graphene is separated, washed and dried.

The time when the depolymerization of epoxy resin is completed is shown in Table 1.

EXAMPLE 9

Depolymerization of Cured Epoxy Resin Material Containing Filler (Graphene Oxide) Using Aqueous Vanadium Pentaoxide ($V_2O_5$) Solution and Separation of Filler (Graphene Oxide)

The cured epoxy resin material used in Example 9 consists of a cured epoxy resin material produced by using a glycidyl amine type epoxy compound and a curing agent containing an acid anhydride group, and graphene oxide.

0.1 g of the cured epoxy resin material is introduced to 70 mL of 2 mol/L aqueous vanadium pentaoxide solution contained in an open glass container, and agitated at 70° C. No autoclave is used.

After 6 hours, it is shown that the epoxy resin is substantially completely depolymerized. Then, graphene oxide in aqueous solution is filtered, separated and dried.

The time when the depolymerization of epoxy resin is completed is shown in Table 1.

EXAMPLE 10

Depolymerization of Cured Epoxy Resin Material Containing Filler (Carbon Nanotubes) Using Aqueous Ruthenium Chloride ($RuCl_3$) Solution and Separation of Filler (Carbon Nanotubes)

The cured epoxy resin material used in Example 10 includes the same cured epoxy resin material as Example 8, obtained by using a cresol novolak glycidyl ether type epoxy compound and a curing agent containing an aromatic amine group, and carbon nanotubes.

0.1 g of the cured epoxy resin material is introduced to 70 mL of 2 mol/L aqueous ruthenium chloride solution contained in an open glass container, and agitated at 70° C. No autoclave is used.

After 5.5 hours, it is shown that the epoxy resin is substantially completely depolymerized. Then, the carbon nanotubes in aqueous solution are separated through filtering, and dried.

The time when the depolymerization of epoxy resin is completed is shown in Table 1.

EXAMPLE 11

Depolymerization of Cured Epoxy Resin Material Containing Filler (Glass Fibers) Using Aqueous Molybdenum Oxide ($MoO_3$) Solution and Separation of Filler (Glass Fibers)

The cured epoxy resin material used in Example 11 includes the same cured epoxy resin material as Example 8, obtained by using a cresol novolak glycidyl ether type epoxy compound and a curing agent containing an aromatic amine group, and glass fibers.

0.1 g of the cured epoxy resin material is introduced to 70 mL of 2 mol/L aqueous molybdenum oxide solution contained in an open glass container, and agitated at 70° C. No autoclave is used.

After 6.5 hours, it is shown that the epoxy resin is substantially completely depolymerized. Then, the glass fibers and molybdenum in aqueous solution are filtered, and the glass fibers are separated, washed and dried.

The time when the depolymerization of epoxy resin is completed is shown in Table 1.

EXAMPLE 12

Depolymerization of Cured Epoxy Resin Material Containing Filler (Alumina) Using Aqueous Methyl Rhenium Trioxide (MTO) Solution and Separation of Filler (Alumina)

The cured epoxy resin material used in Example 12 includes a cured epoxy resin material produced by using a bisphenol A diglycidyl ether type epoxy compound and a curing agent containing an aliphatic amine group, and alumina.

0.1 g of the cured epoxy resin material is introduced to 70 mL of 2 mol/L aqueous MTO solution contained in an open glass container, and agitated at 70° C. No autoclave is used.

After 7 hours, it is shown that the epoxy resin is substantially completely depolymerized. Then, the alumina in aqueous solution is separated through filtering, and dried.

The time when the depolymerization of epoxy resin is completed is shown in Table 1.

EXAMPLE 13

Depolymerization of Cured Epoxy Resin Material Containing Filler (Silicon Carbide) Using Aqueous Osmium Tetraoxide ($OsO_4$) Solution and Separation of Filler (Silicon Carbide)

The cured epoxy resin material used in Example 13 includes a cured epoxy resin material produced by using a bisphenol A diglycidyl ether type epoxy compound and a curing agent containing an aliphatic amine group, and silicon carbide.

0.1 g of the cured epoxy resin material is introduced to 70 mL of 2 mol/L aqueous osmium tetraoxide solution contained in an open glass container, and agitated at 70° C. No autoclave is used.

After 4.5 hours, it is shown that the epoxy resin is substantially completely depolymerized. Then, the silicon carbide in aqueous solution is separated through filtering, and dried.

The time when the depolymerization of epoxy resin is completed is shown in Table 1.

COMPARATIVE EXAMPLE 1

Depolymerization of Cured Epoxy Resin Material in CFRP Using Mixture of Aqueous Potassium Permanganate Solution with Acetone ($KMnO_4$+$H_2O$+Acetone) and Separation of Carbon Fibers 0.1 g of the same CFRP as Example 1 is introduced to 11 mL of a mixture of 2 mol/L aqueous hydrogen peroxide with 33% (volume ration based on the total volume of solvent) of acetone (i.e., 33 vol % of acetone with 67 vol % of water based on the total volume of solvent) contained in an open container, and agitated at 70° C.

Table 1 shows whether the epoxy resin is depolymerized or not. In Comparative Example 1, the epoxy resin is not depolymerized (decomposition ratio: 4.5%, 28% or 34%). Thus, it is not possible to separate carbon fibers.

In Comparative Example 1, the dielectric constant of the reaction system is too low to perform dissolution and ionic dissociation of the potassium permanganate solution. In addition, only a small amount of OH groups are formed by oxidation so that depolymerization is not facilitated. It is noted that even though Comparative Example 1 uses the same CFRP as Examples (cured epoxy resin material using an aromatic diamine-based curing agent having significantly high difficulty in decomposition), the epoxy resin is not depolymerized, as opposed to Examples.

COMPARATIVE EXAMPLE 2

Decomposition of Epoxy Resin Using Aqueous Nitric Acid Solution and Separation of Carbon Fibers 0.1 g of the same CFRP as Example 1 is introduced to aqueous nitric acid solution contained in an open container, and agitated at 70° C.

FIG. 3 shows results of pH measurement of aqueous nitric acid solution which is the reaction system of Comparative Example 3.

In addition, the time when the depolymerization of epoxy resin is completed is shown in Table 1. Table 2 shows the results of measurement of pH of aqueous nitric acid solution after filtering carbon fibers.

After 12 hours, it is shown that the epoxy resin is completely depolymerized. Then, the carbon fibers in aqueous solution are separated through filtering and dried.

[Epoxy Decomposition Results for Examples and Comparative Examples and Characterization of Recovered Filler]

Table 1 shows the time required for decomposition of the epoxy resin according to each of Examples and Comparative Examples. In addition, Table 2 shows the results of measurement of pH of the aqueous potassium permanganate solution and aqueous nitric acid solution obtained after filtering carbon fibers according to Example 1 and Comparative Example 2.

TABLE 1

| Example (Amount of CFRP) | Transition metal salt/ Transition metal oxide (Concentration) | Reaction solvent (Dielectric constant) | Depolymerization completion time [h] |
|---|---|---|---|
| Example 1 (0.1 g) | $KMnO_4$ (2 mol/L) | $H_2O$ (80.2) | 3 |
| Example 2 (0.1 g) | $KMnO_4$ (2 mol/L) | Supercritical $H_2O$ (80.2) | 2 |
| Example 3 (1.5 g) | $KMnO_4$ (2 mol/L) | $H_2O$ (80.2) | 10 |
| Example 4 (1.5 g) | $KMnO_4$ (4 mol/L) | $H_2O$ (80.2) | 7 |
| Example 5 (1.5 g after crushing) | $KMnO_4$ (4 mol/L) | $H_2O$ (80.2) | 4 |
| Example 6 (1.5 g after dipping) | $KMnO_4$ (4 mol/L) | $H_2O$ (80.2) | 5 |
| Example 7 (1.5 g after crushing/ dipping) | $KMnO_4$ (4 mol/L) | $H_2O$ (80.2) | 3 |
| Example 8 (0.1 g) | $CrO_3$ (2 mol/L) | $H_2O$ (80.2) | 6.5 |
| Example 9 (0.1 g) | $V_2O_5$ (2 mol/L) | $H_2O$ (80.2) | 6 |
| Example 10 (0.1 g) | $RuCl_3$ (2 mol/L) | $H_2O$ (80.2) | 5.5 |
| Example 11 (0.1 g) | $MoO_3$ (2 mol/L) | $H_2O$ (80.2) | 6.5 |
| Example 12 (0.1 g) | $CH_3ReO_3$ (2 mol/L) | $H_2O$ (80.2) | 7 |
| Example 13 (0.1 g) | $OsO_4$ (2 mol/L) | $H_2O$ (80.2) | 4.5 |

TABLE 1-continued

| Example (Amount of CFRP) | Transition metal salt/ Transition metal oxide (Concentration) | Reaction solvent (Dielectric constant) | Depolymerization completion time [h] |
|---|---|---|---|
| Comparative Example 1 (0.1 g) | $KMnO_4$ (2 mol/L) | $H_2O$ + Acetone (44) | Not dissolved |
| Comparative Example 2 (0.1 g) | $HNO_3$ (2 mol/L) | $H_2O$ (80.2) | 12 |

TABLE 2

| | Aqueous potassium permanganate solution (Example 1) | Aqueous nitric acid solution (Comparative Example 2) |
|---|---|---|
| pH | 3 | <1 |

TABLE 3

| Example (Filler) | Tensile strength before/after depolymerization [GPa] |
|---|---|
| Carbon fiber raw material used in CFRP | 4.1 |
| Example 1 (Carbon fibers) | 3.7 |
| Example 4 (Carbon fibers) | 3.7 |
| Example 6 (Carbon fibers) | 3.8 |

As can be seen from Examples and Comparative Examples in Table 1, Examples show relatively short reaction time at a low reaction temperature. By contrast, when using acetone in an amount of about 33 vol % based on the total volume of reaction solvent in Comparative Example 1 (dielectric constant: about 44), it can be seen that the cured epoxy resin material is not decomposed.

Meanwhile, when using aqueous nitric acid solution in Comparative Example 2, the reaction time is four times slower than Example 1 using aqueous potassium permanganate solution. As can be seen from Table 2, the composition used in Example 1 has a higher pH value than aqueous nitric acid solution, suggesting that the reaction condition in Example 1 is milder.

FIG. 5 is a graph illustrating results of tensile strength measurement of the carbon fibers (carbon fiber raw materials, denoted as V-CF) used for CFRP in Example 1 as compared to the carbon fibers recovered (denoted as Recycled CF) in Example 1.

After measuring the tensile strength of the carbon fibers recovered from Example 1, it can be seen that carbon fibers undergoing less degradation of tensile strength (10% or less) are recovered by decomposing CFRP through the embodiments disclosed herein. On the contrary, the carbon fibers recovered from CFRP through a pyrolysis process undergoes degradation of tensile strength of at least 15% based on the raw materials of carbon fibers (Mater. Res. Bull. 2004, 39, 1549). As compared to this, it can be seen that the depolymerization method according to embodiments of the present disclosure allows recovery of carbon fibers having excellent properties.

Meanwhile, in Table 1, each of Examples 4-7 uses the same cured epoxy resin material and the same composition for depolymerization, except that Examples 5-7 include a pretreatment process and Example 4 includes no pretreatment process. Although depolymerization proceeds rapidly in the case of Example 4, a cured epoxy resin material may be depolymerized more rapidly by virtue of a pretreatment process, and depolymerization of a cured epoxy resin material is completed in the shortest time in the case of Example 7 including both a crushing process and a dipping process.

The reason why the depolymerization completion time is reduced is thought to be that the pretreatment process increases the depolymerization reaction area of the cured epoxy resin material, thereby activating depolymerization. Such activation of depolymerization occurs both in the case of an increase in reaction area using a physical process, such as crushing, and in the case of an increase in reaction area using a chemical process, such as dipping.

As can be seen from Table 3, the carbon fibers recovered from Example 6 including a dipping process show higher tensile strength as compared to the carbon fibers recovered from Example 4 including no dipping process. This suggests that the pretreatment process reduces the time required for depolymerization of a cured epoxy resin material and thus degradation of properties of carbon fibers that may occur during depolymerization is further decreased.

As can be seen from the above results of measurement of tensile strength, carbon fibers having excellent properties are recovered from CFRP by depolymerizing CFRP according to the embodiments of the present disclosure.

EXPERIMENT 2

In Experiment 2, a mixed solvent of water with each of various organic solvents (acetone, isopropyl alcohol and ethanol) is used as reaction solvents and the mixing ratio is varied so that dielectric constant may be varied. Then, a degree of epoxy depolymerization is determined. Potassium permanganate ($KMnO_4$) is used as the compound. The following Tables 4-6 show the Experiment conditions and results.

TABLE 4

| CFRP Weight | Acetic acid Pretreatment condition | KMnO4 Treatment condition | Water: acetone | Mixed solvent Dielectric constant | Epoxy residue * (wt %) | Decomposition ratio ** (%) |
|---|---|---|---|---|---|---|
| 0.1 g | 120° C., 30 min. | 2M, 70 ml, 90° C. | 0:100 | 19.6 | 19.1 (after 24 hours) | 4.5 (after 24 hours) |
| | | | 65:35 | 62.5 | 14 (After 24 hours) | 28 (After 24 hours) |
| | | | 88:12 | 74.8 | 13.2 (After 24 hours) | 34 (After 24 hours) |
| | | | 100:0 | 80.2 | 0 (After 5 hours) | 100 (After 5 hours) |

TABLE 5

| CFRP Weight | Acetic acid Pretreatment condition | KMnO4 Treatment condition | Water: IPA | Mixed solvent Dielectric constant | Epoxy residue * (wt %) | Decomposition ratio ** (%) |
|---|---|---|---|---|---|---|
| 0.1 g | 120° C., 30 min. | 2M, 70 ml, 90° C. | 0:100 | 18.6 | 19 (after 24 hours) | 5 (after 24 hours) |
| | | | 65:35 | 58.4 | 17.2 (After 24 hours) | 13.9 (After 24 hours) |
| | | | 88:12 | 73.1 | 10.1 (After 24 hours) | 49.5 (After 24 hours) |
| | | | 100:0 | 80.2 | 0 (After 5 hours) | 100 (After 5 hours) |

TABLE 6

| CFRP Weight | Acetic acid Pretreatment condition | KMnO4 Treatment condition | Water: ethanol | Mixed solvent Dielectric constant | Epoxy residue * (wt %) | Decomposition ratio ** (%) |
|---|---|---|---|---|---|---|
| 0.1 g | 120° C., 30 min. | 2M, 70 ml, 90° C. | 0:100 | 25 | 18.1 (after 24 hours) | 9.5 (after 24 hours) |
| | | | 65:35 | 62.6 | 18.2 (After 24 hours) | 9 (After 24 hours) |

TABLE 6-continued

| CFRP Weight | Acetic acid Pretreatment condition | KMnO4 Treatment condition | Water: ethanol | Mixed solvent Dielectric constant | Epoxy residue * (wt %) | Decomposition ratio ** (%) |
|---|---|---|---|---|---|---|
| | | | 88:12 | 74.6 | 10.4 (After 24 hours) | 48 (After 24 hours) |
| | | | 100:0 | 80.2 | 0 (After 5 hours) | 100 (After 5 hours) |

Epoxy resin content before depolymerization of CFRP is 19.4% (wt % of epoxy resin based on total CFRP). An epoxy residue is calculated after 24 hours or 5 hours based on this. For example, an epoxy residue of 19.1 wt % after 24 hours means that the epoxy resin is in an amount of 19.1 wt % based on total CFRP after carrying out depolymerization for 24 hours. Meanwhile, an epoxy residue of 0 wt % after 5 hours means that the epoxy resin is already in an amount of 0 wt % based on total CFRP after 5 hours. This is significantly different from an epoxy residue of 10 wt % or more after 24 hours.

As described hereinabove, decomposition ratio is calculated by the following formula: Decomposition ratio=[(epoxy resin content before depolymerization of CFRP−epoxy resin content after depolymerization of CFRP)/(epoxy resin content before depolymerization of CFRP)]×100

Figure 7:
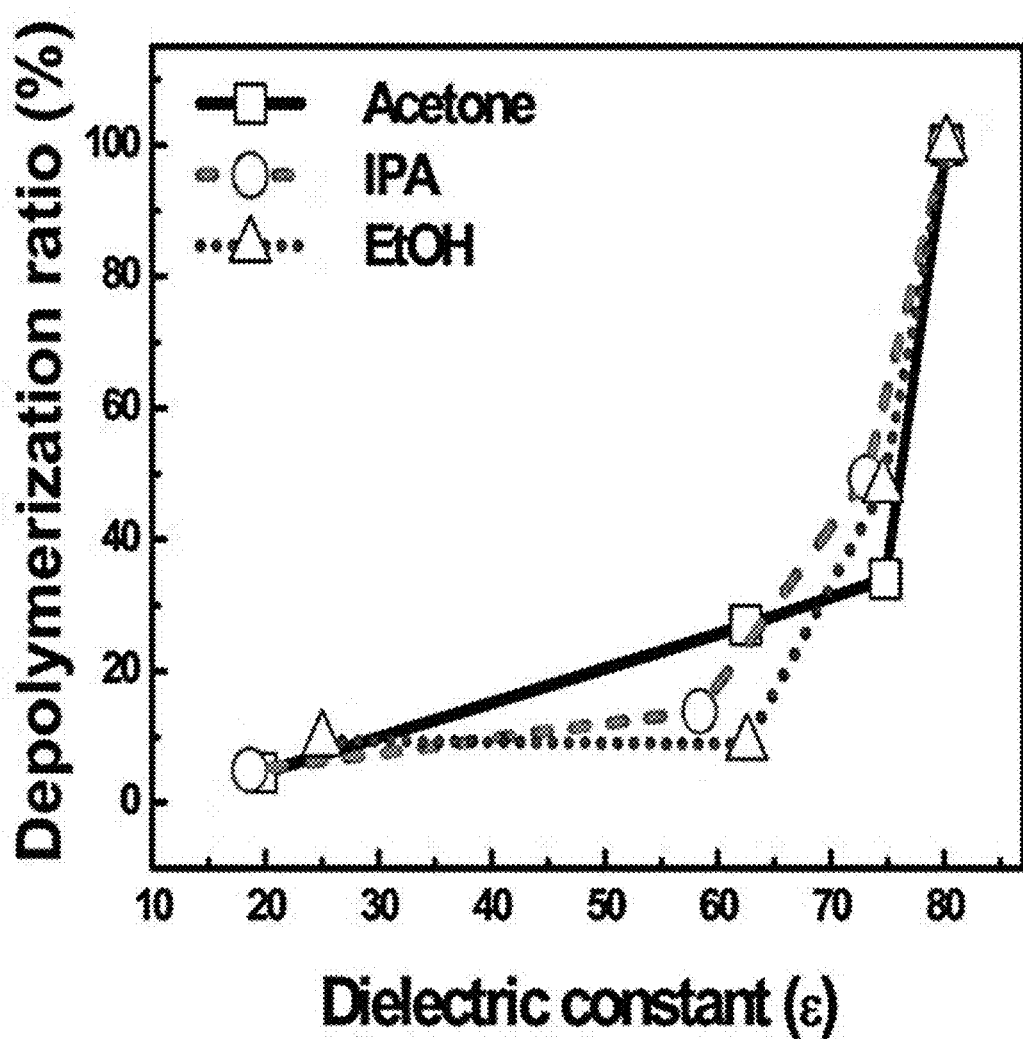
FIG. 7 is a graph illustrating results of Table 4-Table 6 in terms of decomposition ratios of a cured resin material as a function of the dielectric constant of the reaction system.

FIG. 7 is a graph illustrating results of Table 4-Table 6 in terms of decomposition ratios of a cured resin material as a function of the dielectric constant of the reaction system.

As can be seen from FIG. 7, when the dielectric constant is about 65 or more, the slope of depolymerization efficiency rapidly increases. Meanwhile, in the case of water alone, decomposition ratio already reaches 100 within 5 hours but not 24 hours. Thus, when using water alone, a significant increase in decomposition ratio is shown as compared to a solvent mixture with an organic solvent.

EXPERIMENT 3

In Experiment 3, X-ray photoelectron spectroscopy (XPS) is carried out for the carbon fibers used for CFRP used in Example 1 and for the carbon fibers recovered after carrying out depolymerization using $KMnO_4$.

Figure 8A:
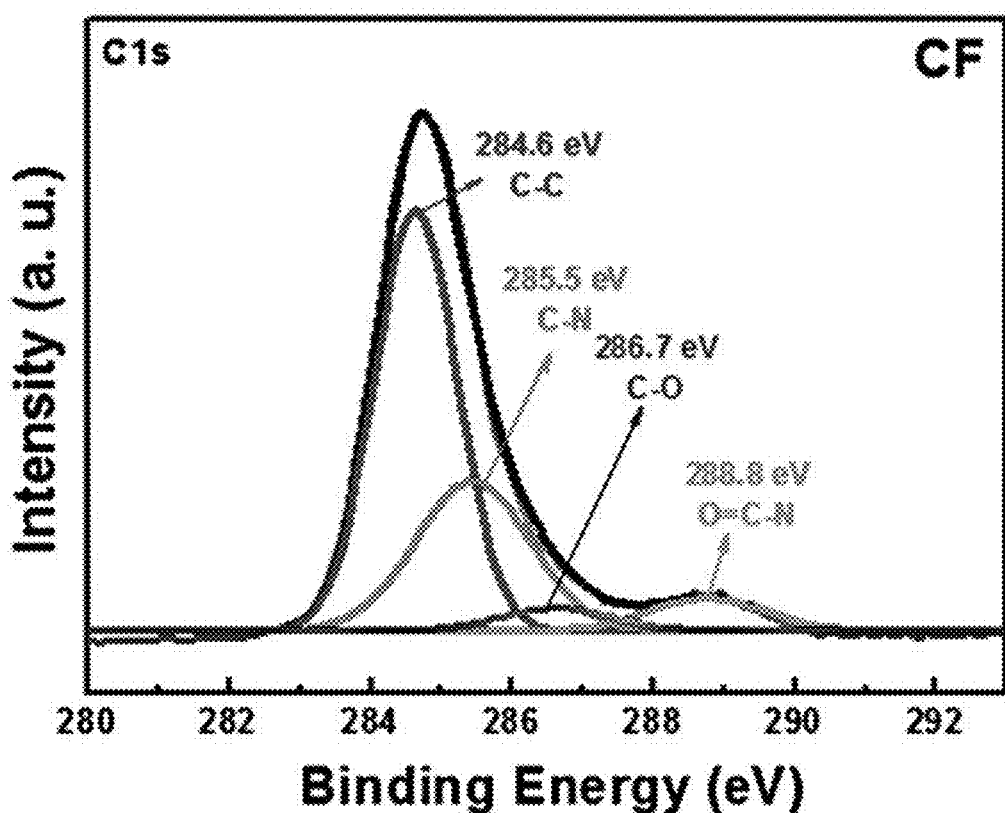
FIG. 8A shows results of X-ray photoelectron spectroscopy (XPS) of carbon fibers (denoted as CF) used in CFRP in Experiment 3.

FIG. 8A shows results of X-ray photoelectron spectroscopy (XPS) of carbon fibers (denoted as CF) used in CFRP in Experiment 3.

FIG. 8B shows results of X-ray photoelectron spectroscopy (XPS) of carbon fibers recovered after carrying out depolymerization (denoted as R-CF) using $KMnO_4$ in Experiment 3.

FIG. 8C shows results of XPS elemental contents of carbon fibers (denoted as CF) used in CFRP and the carbon fibers recovered after carrying out depolymerization (denoted as R-CF) using $KMnO_4$ in Experiment 3.

As can be seen from FIGS. 8A to 8C, Mn element as residue of a transitional metal salt is detected in an amount of 2.1% or less in the case of R-CF recovered by using $KMnO_4$.

As can be seen from the foregoing, water alone is particularly preferable as a reaction solvent used in combination with a transition metal salt or a transition metal oxide containing a transition metal in the composition for depolymerization according to the embodiments of the present disclosure. When using water in combination with another solvent, a rapid increase in decomposition ratio occurs at its dielectric constant of at least about 65. Particularly, when using water alone, reaction time itself is decreased significantly and a significant increase in reaction efficiency is shown.

What is claimed is:

1. A method for depolymerization of a cured epoxy resin material, comprising:
introducing a cured epoxy resin material to a composition for depolymerization comprising a transition metal salt or a transition metal oxide containing a transition metal element in an aqueous solvent in a liquid state, having a dielectric constant of 65 to 80, wherein the depolymerization is carried out at a temperature of 20° C. to 200° C.

2. The method for depolymerization of a cured epoxy resin material according to claim 1, wherein the temperature is 20° C. to 100° C.

3. The method for depolymerization of a cured epoxy resin material according to claim 1, wherein the amount of cured epoxy resin material is 1-90 parts by weight based on 100 parts by weight of the composition for depolymerization.

4. The method for depolymerization of a cured epoxy resin material according to claim 1, further comprising introducing a new cured epoxy resin material to the composition for depolymerization remaining after depolymerizing the cured epoxy resin material.

5. The method for depolymerization of a cured epoxy resin material according to claim 1, further comprising pretreating the cured epoxy resin material before introducing the cured epoxy resin material to the composition for depolymerization such that the cured epoxy resin material has an increased reaction surface area.

6. The method for depolymerization of a cured epoxy resin material according to claim 5, wherein the pretreatment is physical pretreatment, chemical pretreatment or a combination thereof.

7. The method for depolymerization of a cured epoxy resin material according to claim 6, wherein the physical pretreatment is at least one selected from dry crushing and wet crushing.

8. The method for depolymerization of a cured epoxy resin material according to claim 6, wherein the chemical pretreatment is carried out by dipping the cured epoxy resin material into an acidic composition having a pH less than 7.

9. The method for depolymerization of a cured epoxy resin material according to claim 1, wherein a filler obtained after the depolymerization has a transition metal remaining therein.

10. The method of claim 1, wherein the aqueous solvent is water alone.

* * * * *